(12) United States Patent
Lin

(10) Patent No.: US 7,634,714 B2
(45) Date of Patent: Dec. 15, 2009

(54) DECODING SYSTEM FOR EIGHT-TO-FOURTEEN MODULATION OR EIGHT-TO-SIXTEEN MODULATION

(75) Inventor: Wen-Chang Lin, Jhudong Township, Hsinchu County (TW)

(73) Assignee: Sunext Technology Co., Ltd., Hsinchu (TW)

( * ) Notice: Subject to any disclaimer, the term of this patent is extended or adjusted under 35 U.S.C. 154(b) by 535 days.

(21) Appl. No.: 11/390,205

(22) Filed: Mar. 28, 2006

(65) Prior Publication Data
US 2006/0242545 A1 Oct. 26, 2006

(30) Foreign Application Priority Data
Apr. 7, 2005 (TW) ............................... 94110965 A

(51) Int. Cl.
*H03M 13/00* (2006.01)
(52) U.S. Cl. .................. 714/795; 714/792; 714/794
(58) Field of Classification Search ............... 714/795, 714/794, 791, 792; 735/265
See application file for complete search history.

(56) References Cited

U.S. PATENT DOCUMENTS

| 5,764,024 A * | 6/1998 | Wilson ..................... 318/805 |
| 7,129,794 B2 * | 10/2006 | Lin ............................ 331/25 |
| 7,178,093 B2 * | 2/2007 | Chen et al. ................. 714/796 |

* cited by examiner

*Primary Examiner*—Scott T Baderman
*Assistant Examiner*—Fritz Alphonse
(74) *Attorney, Agent, or Firm*—Bacon & Thomas, PLLC

(57) ABSTRACT

A decoding system for eight-to-fourteen modulation or eight-to-sixteen modulation (EFM/ESM), which has an analog to digital converter (ADC), an adaptive equalizer and a Viterbi decoder. The ADC receives an analog signal with an EFM or ESM feature, and converts the analog signal into a digital signal with the EFM or ESM feature. The adaptive equalizer converts the EFM or ESM digital signal into a first signal with a minimum phase feature. The Viterbi decoder receives the first signal and generates a decoding signal in accordance with a Viterbi algorithm and a channel model, and the Viterbi decoder discards nonexistent paths in accordance with the EFM or ESM feature when computing branch metric of a branch or a node.

6 Claims, 16 Drawing Sheets

US 7,634,714 B2

DECODING SYSTEM FOR EIGHT-TO-FOURTEEN MODULATION OR EIGHT-TO-SIXTEEN MODULATION

BACKGROUND OF THE INVENTION

1. Field of the Invention

The invention relates to the technical field of decoding and, more particularly, to a decoding system for eight-to-fourteen modulation or eight-to-sixteen modulation (EFM/ESM).

2. Description of Related Art

In an inter-symbol interference (ISI) environment, there is an effect of read data due to previous and subsequent data bits, a partial response maximum likelihood (PRML) technique is typically used to eliminate the ISI effect occurring in received data. Typically, the Viterbi decoding is used to decode a signal with the ISI.

The Viterbi decoding is based on conditional probability to check possible paths to accordingly select the best one. FIG. 1 is a typical PRabba channel model. FIG. 2 shows a schematic diagram of Trellis corresponding to the typical PRabba channel model of FIG. 1 for a=1 and b=2.

Typically, an eight-to-fourteen modulation/eight-to-sixteen modulation (EFM/ESM) is used for DVD data and CD data. Thus, the run length of a datastream excludes one and two. The Trellis diagram of FIG. 2 can be simplified into a Trellis diagram of FIG. 3 when an EFM/ESM datastream is decoded. As shown in FIG. 3, the run length of a datastream excludes one and two, and dotted lines indicate a4 as −1, solid lines indicate a4 as +1. FIG. 4 is a schematic diagram of a Viterbi decoding performed on an input sequence {−1, −1, −1, −1, +1, +1, +1, −1, −1, −1, −1, +1, +1, +1, +1, +1} with the simplified Trellis of FIG. 3 and to thus generate an output sequence {4, 0, −4, −6, −4, 0, 4, 4, 0, −4, −6, −6, −4, 0, 4, 6, 6, 6}. The decoding starts with node (−1 −1 −1) and computes branch metric of rows 0 and 1 in accordance with a received data. Node (−1 −1 −1) has two branches connected to nodes (−1 −1 −1) and (−1 −1 +1) respectively. For computing branch metric from node (−1 −1 −1) to node (−1 −1 −1), an output data (4) is brought into path value equations, i.e., s=4 is substituted into equations 9+3s and 4+2s to thus obtain values 21 and 12 respectively. The values 21 and 12 are denoted on the upper of nodes (−1 −1 −1) and (−1 −1 +1) of row 1. For computing branch metric from row 1 to row 2, s=0 is substituted into equations 9+3s, 4+2s and 0 to thus obtain values 9, 4 and 0 respectively. Next, values 9 and 21 are added, values 4 and 21 are added, and values 0 and 12 are added respectively, thereby obtaining accumulated branch metrics 30, 25 and 12. The values 30, 25 and 12 are denoted on the upper of nodes (−1 −1 −1), (−1 −1 +1) and (−1 +1 +1) respectively, and similar operation is repeated. However, the read speed of DVD and CD drives is increased quickly, and the prior art increases a clock of a decoding chip to overcome the increase of read speed, but it will also increase the design difficulty of the decoding chip. In addition, due to the increased operating frequency, the decoding chip needs to consume more power and has the problem of heat dissipation.

Therefore, it is desirable to provide an improved decoding system to mitigate and/or obviate the aforementioned problems.

SUMMARY OF THE INVENTION

The object of the invention is to provide a decoding system for eight-to-fourteen modulation or eight-to-sixteen modulation (EFM/ESM), which can avoid the design complexity of a decoding chip, and further eliminate the problems of increased power consumption and heat dissipation of the decoding chip.

In accordance with one aspect of the present invention, there is provided a decoding system for eight-to-fourteen modulation or eight-to-sixteen modulation (EFM/ESM). The system includes an analog to digital converter (ADC), an adaptive equalizer and a Viterbi decoder. The ADC receives an analog signal with an EFM or ESM feature, and converts the analog signal into a digital signal with the EFM or ESM feature. The adaptive equalizer is connected to the ADC to convert the EFM or ESM digital signal into a first signal with a minimum phase feature. The Viterbi decoder is connected to the adaptive equalizer to receive the first signal and to generate a decoding signal in accordance with a Viterbi algorithm and a channel model, and the Viterbi decoder discards nonexistent paths in accordance with the EFM or ESM feature when computing branch metric of a branch to a node.

In accordance with another aspect of the present invention, there is provided a decoding system for eight-to-fourteen modulation or eight-to-sixteen modulation (EFM/ESM). The system includes an analog to digital converter (ADC), a slice circuit, a frequency and phase recovery, an adaptive equalizer and a Viterbi decoder. The ADC receives an analog signal with an EFM or ESM feature, and converts the analog signal into a digital signal with the EFM or ESM feature. The slice circuit has a hysteresis feature and converts the analog signal into a second signal. The frequency and phase recovery is coupled between the slice circuit and the ADC to generate an adjusting signal in accordance with the second signal to accordingly adjust a sampling time of the ADC, thereby restoring frequency and phase of the analog signal. The adaptive equalizer is connected to the ADC to convert the digital signal into a first signal with a minimum phase feature. The Viterbi decoder is connected to the adaptive equalizer to receive the first signal and to generate a decoding signal in accordance with a Viterbi algorithm and a channel model, and the Viterbi decoder discards nonexistent paths in accordance with the EFM or ESM feature when computing branch metric of a branch to a node.

Other objects, advantages, and novel features of the invention will become more apparent from the following detailed description when taken in conjunction with the accompanying drawings.

DETAILED DESCRIPTION OF THE PREFERRED EMBODIMENT

Figure 5:
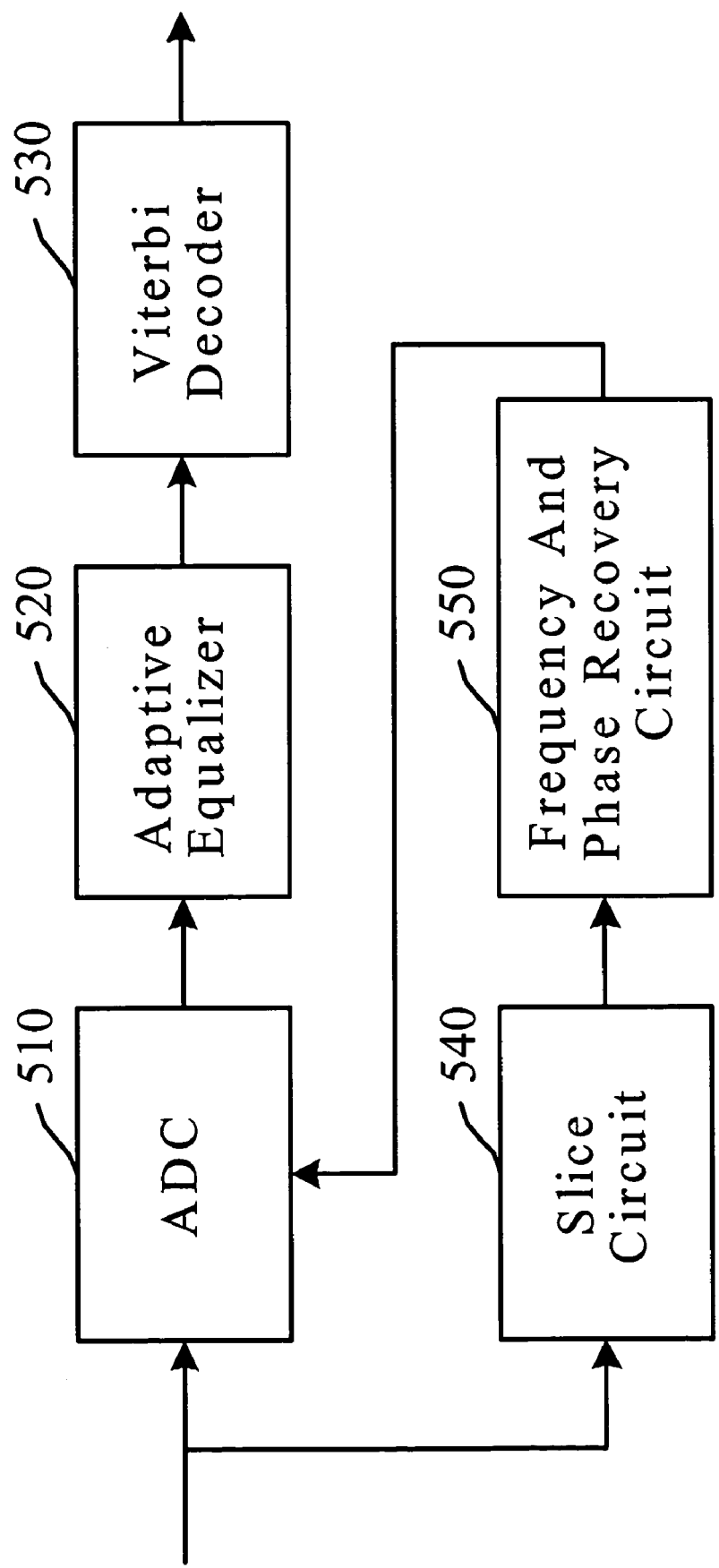
FIG. 5 is a block diagram of a decoding system for eight-to-fourteen modulation or eight-to-sixteen modulation (EFM/ESM) in accordance with the invention.

FIG. 5 is a block diagram of a decoding system for eight-to-fourteen modulation or eight-to-sixteen modulation (EFM/ESM) in accordance with the invention. As shown in FIG. 5, the system includes an analog to digital converter (ADC) 510, an adaptive equalizer 520, a Viterbi decoder 530, a slice circuit 540 and a frequency and phase recovery circuit 550.

As shown in FIG. 5, the ADC 510 receives an analog signal with an EFM or ESM feature, and converts the analog signal into a digital signal with the EFM or ESM feature. The slice circuit 540 has a hysteresis feature and detects a value of an input signal (the analog signal). Accordingly, the slice circuit 540 outputs a positive voltage when the value of the input signal is greater than a first hysteresis value, and outputs zero voltage when the value of the input signal is smaller than a second hysteresis value. The slice circuit 540 converts the analog signal into a second signal, which can be the positive voltage or zero voltage. The frequency and phase recovery 550 is coupled between the slice circuit 540 and the ADC 510 to generate an adjusting signal in accordance with the second signal to accordingly adjust the sampling time of the ADC 510. Thus, the frequency and phase recovery 550 can use the second signal generated by the slice circuit 540 to restore frequency and phase of the analog signal.

The adaptive equalizer 520 is connected to the ADC 510 to convert the digital signal into a first signal with a minimum phase feature. The Viterbi decoder 530 is connected to the adaptive equalizer 520 to receive the first signal and to generate a decoding signal in accordance with a Viterbi algorithm and a channel model, wherein the Viterbi decoder discards nonexistent paths in accordance with the EFM or ESM feature when computing branch metric of a branch to a node.

Figure 1:
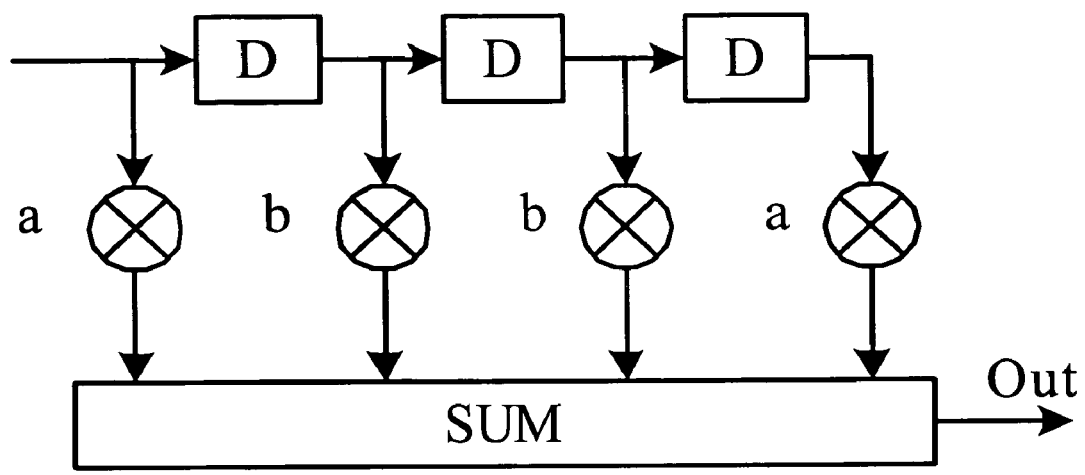
FIG. 1 is a schematic diagram of a typical PRabba channel model.
Figure 2:
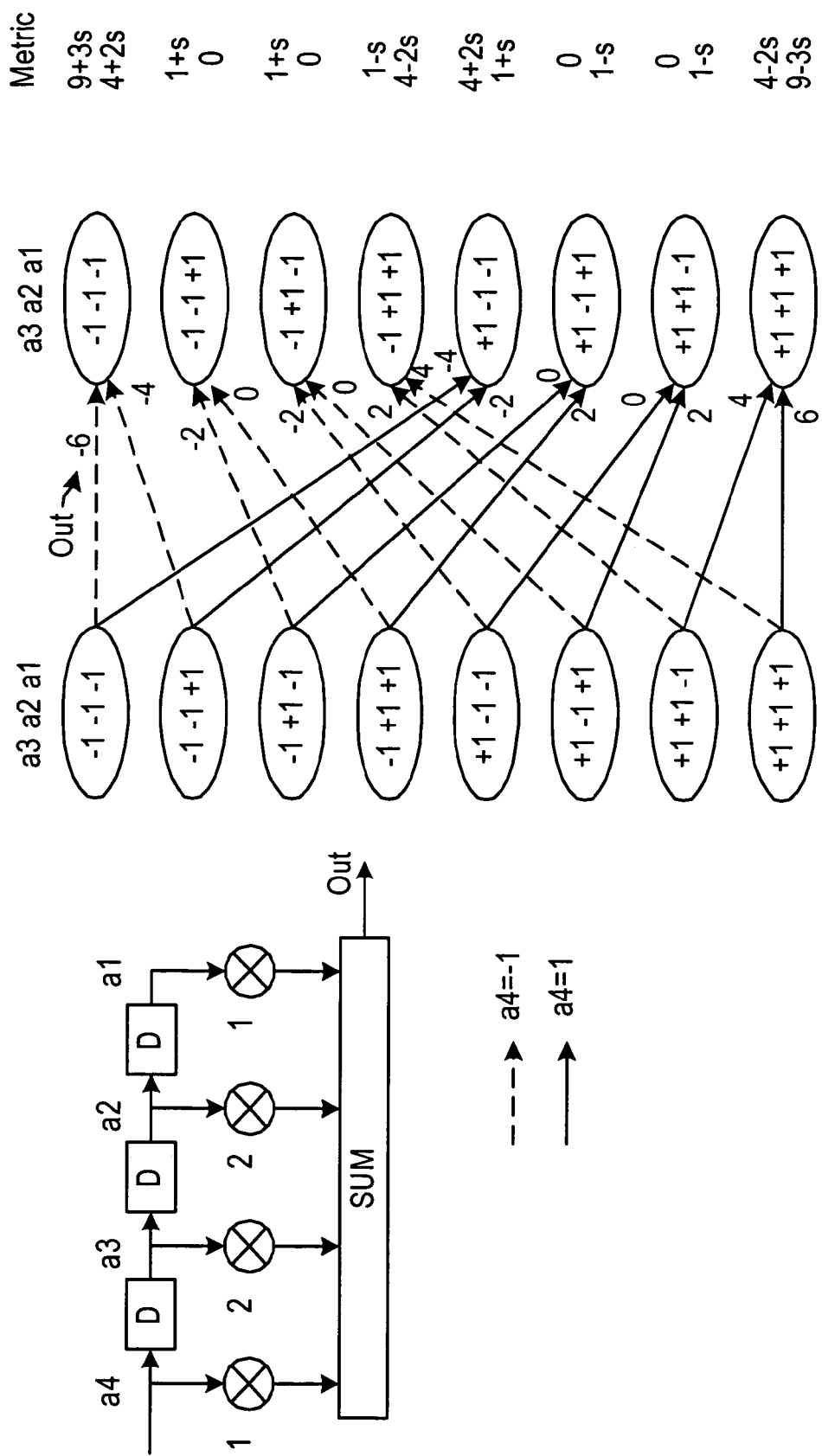
FIG. 2 is a schematic diagram of Trellis corresponding to the typical PRabba channel model of FIG. 1 for a=1 and b=2.
Figure 3:
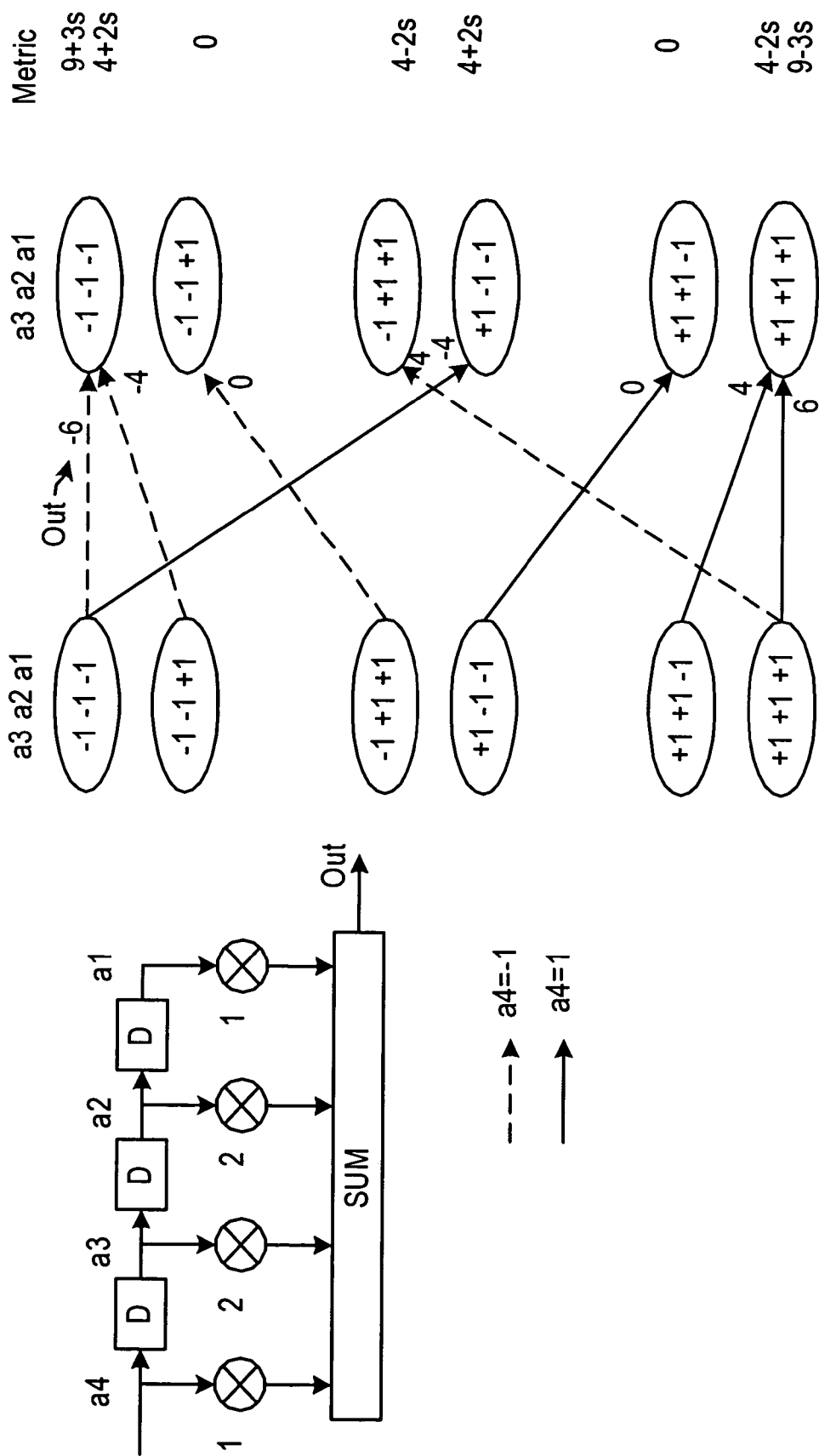
FIG. 3 is a schematic diagram of a typical simplified Trellis of FIG. 2.
Figure 4A:
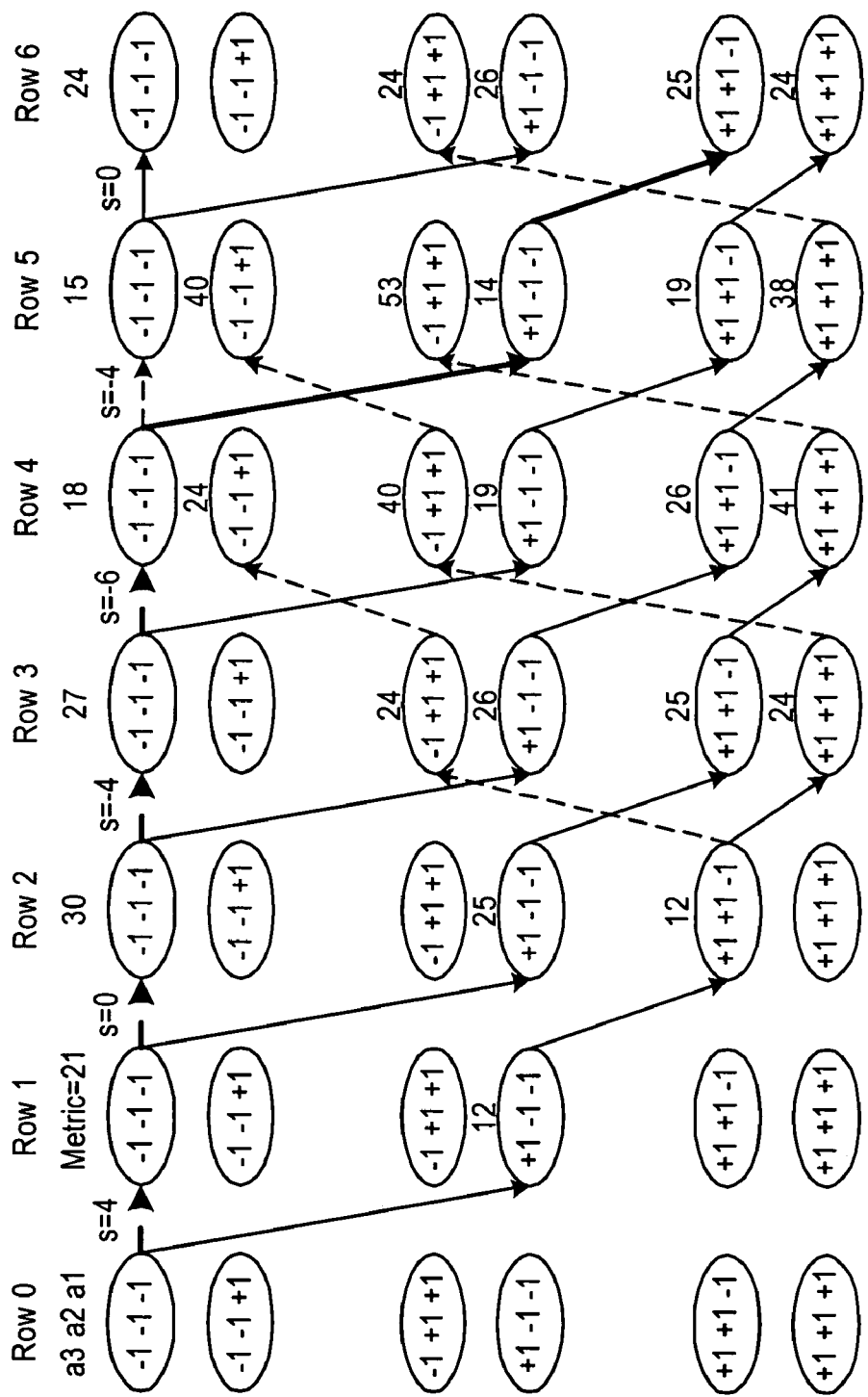
FIGS. 4A, 4B, 4C and 4D are schematic diagrams of a Viterbi decoding performed with the typical simplified Trellis of FIG. 3.
Figure 4B:
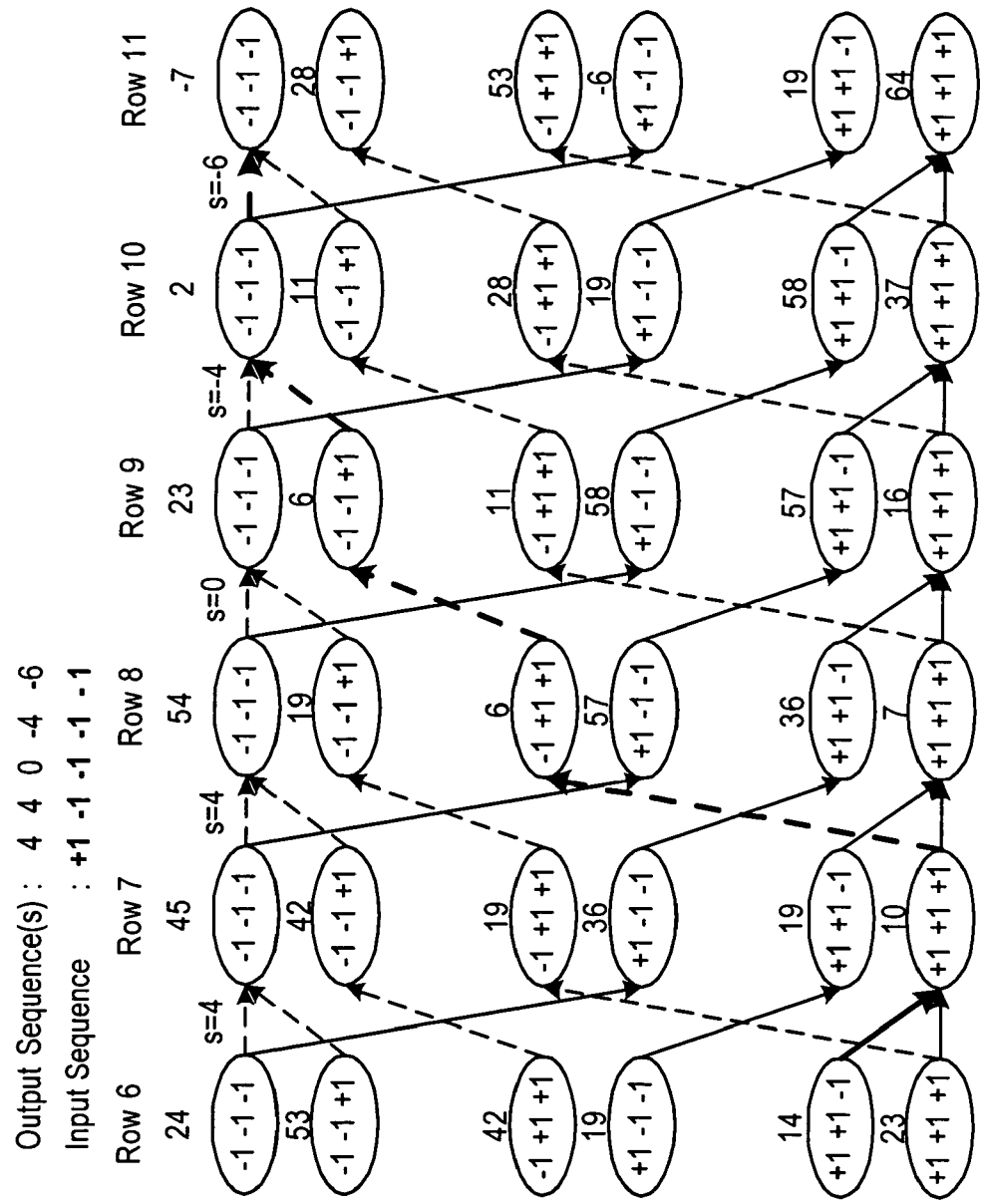
Figure 4C:
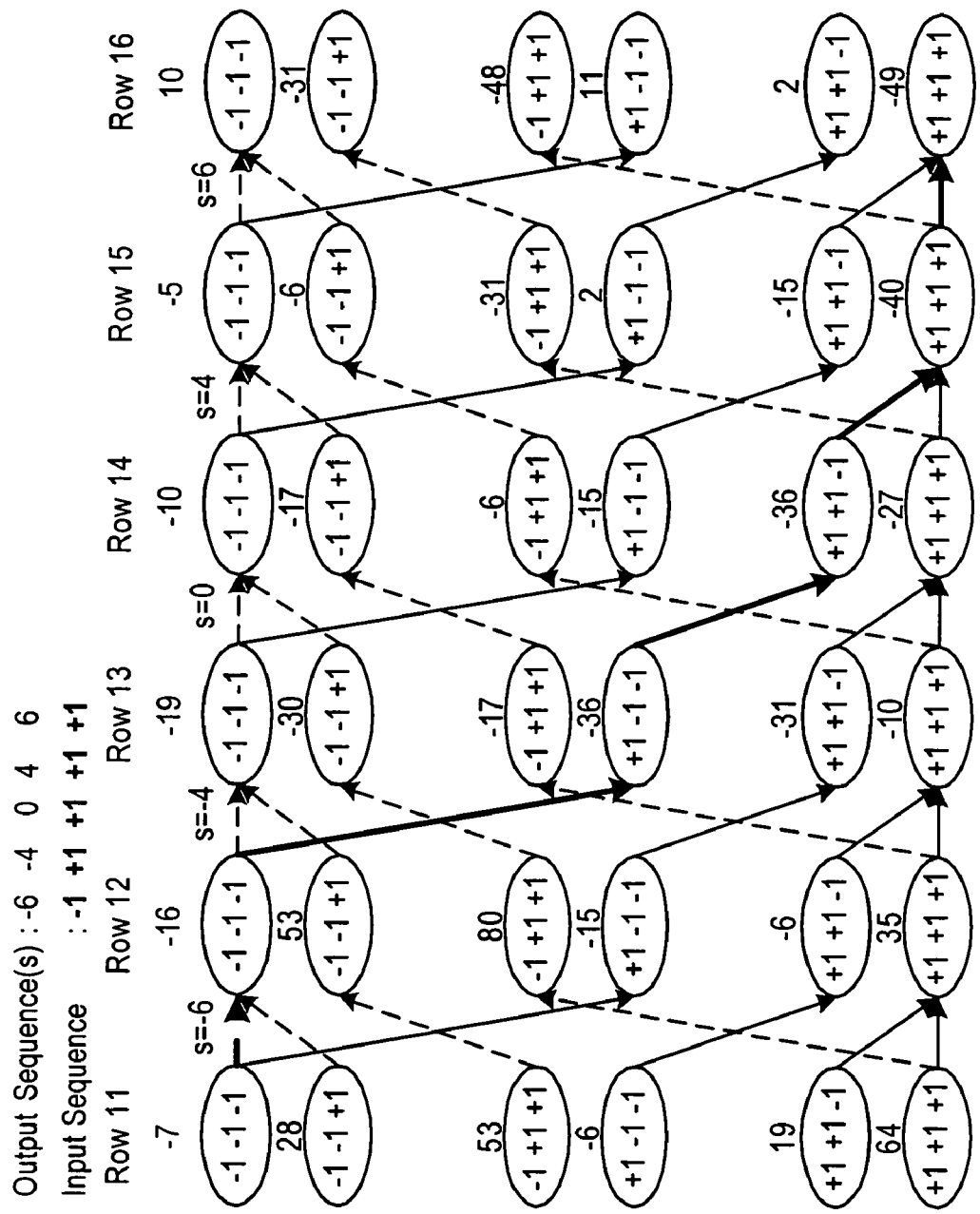
Figure 4D:
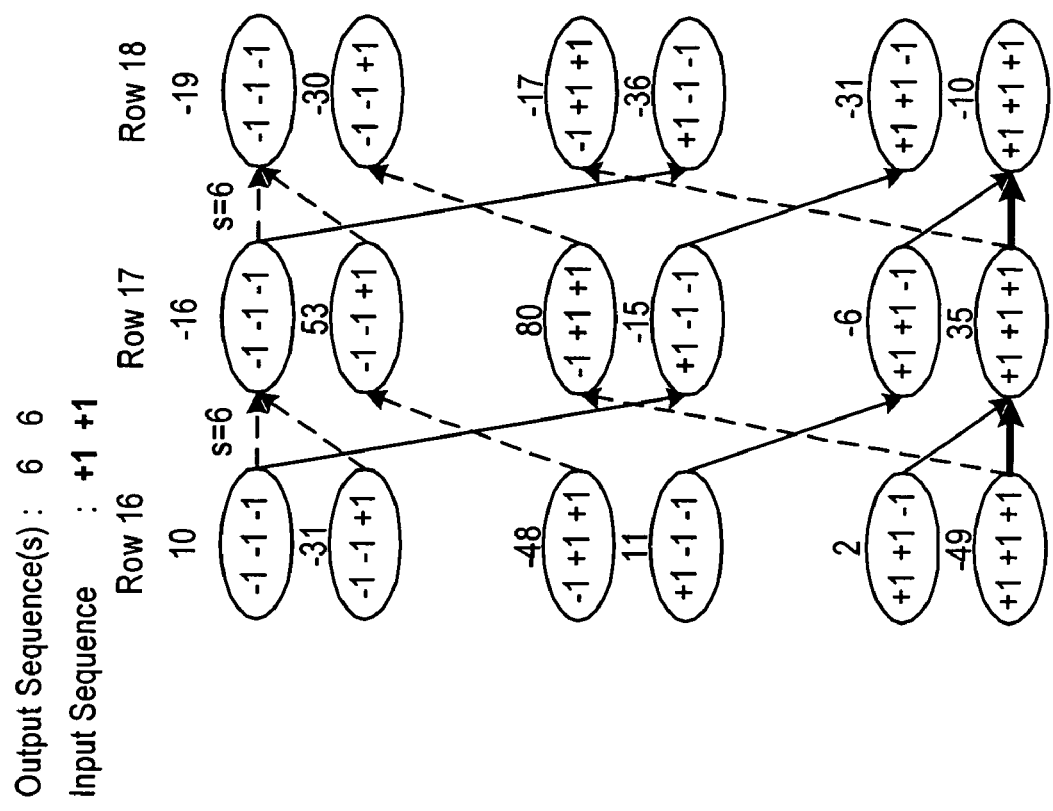
Figure 6:
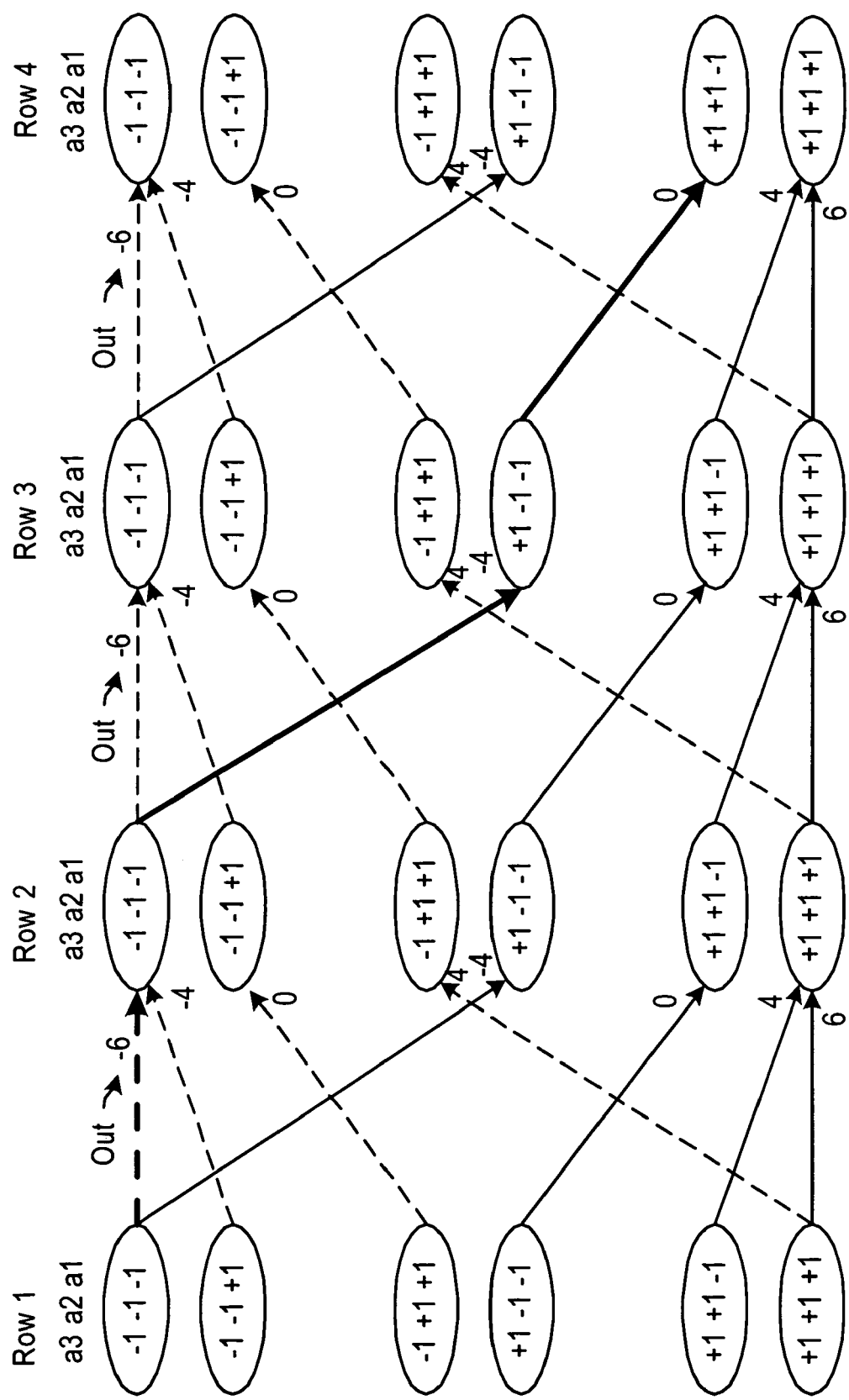
FIG. 6 is a schematic diagram of the Trellis of FIG. 3 enlarged from two to four rows in accordance with the invention.

FIG. 6 is a schematic diagram of the Trellis of FIG. 3 extended from two rows to four rows in accordance with the invention. As shown in FIG. 6, when nodes of rows 1 and 3 are determined, a node of row 2 is determined unique. Namely, when a decoding path passes through the node (−1 −1 −1) of row 1 and the node (−1 −1 +1) of row 3, it has to pass through the node (−1 −1 −1) of row 2, as shown in the bold lines of FIG. 6. Similarly, when a decoding path passes through the node (−1 −1 −1) of row 2 and the node (−1 +1 +1) of row 4, it has to pass through the node (−1 −1 +1) of row 3.

Figure 7:
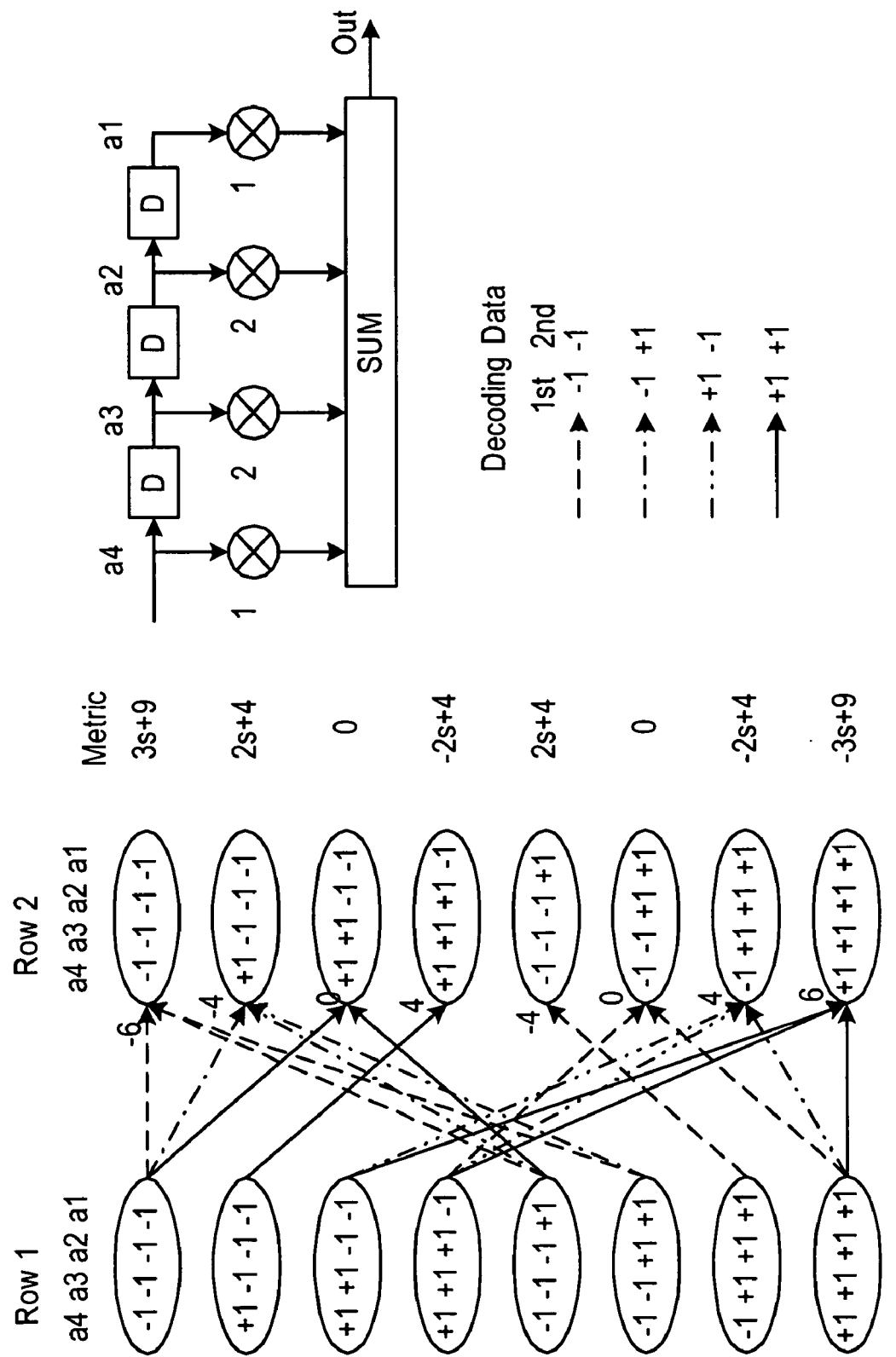
FIG. 7 is a diagram of a modified Trellis in accordance with the invention.

As cited, the Trellis of FIG. 3 is modified and shown in FIG. 7, which can decode two bits at a time. For example, when a node (−1 −1 −1 −1) of row 1 meets with (−1 −1) decoding data, a node (−1 −1 −1 −1) of row 2 is entered as shown in the dashed line (- - →) of FIG. 7. When the node (−1 −1 −1 −1) of row 1 meets with (−1 +1) decoding data, a node (−1 −1 −1 +1) of row 2 is entered as shown in the dot-and-dash line (- · →) of FIG. 7. When the node (−1 −1 −1 −1) of row 1 meets with (+1 +1) decoding data, a node (−1 −1 +1 +1) of row 2 is entered as shown in the solid line (→) of FIG. 7. Due to the EFM/ESM, the run length of a datastream excludes one or two runs, and thus the node (−1 −1 −1 −1) of row 1 does not meet with (+1 −1) decoding data. When the node (+1 +1 +1 +1) of row 1 meets with (+1 +1) decoding data, a node (+1 +1 +1 −1) of row 2 is entered as shown in the two-dot-and-dash line (- ·· →) of FIG. 7.

Figure 8A:
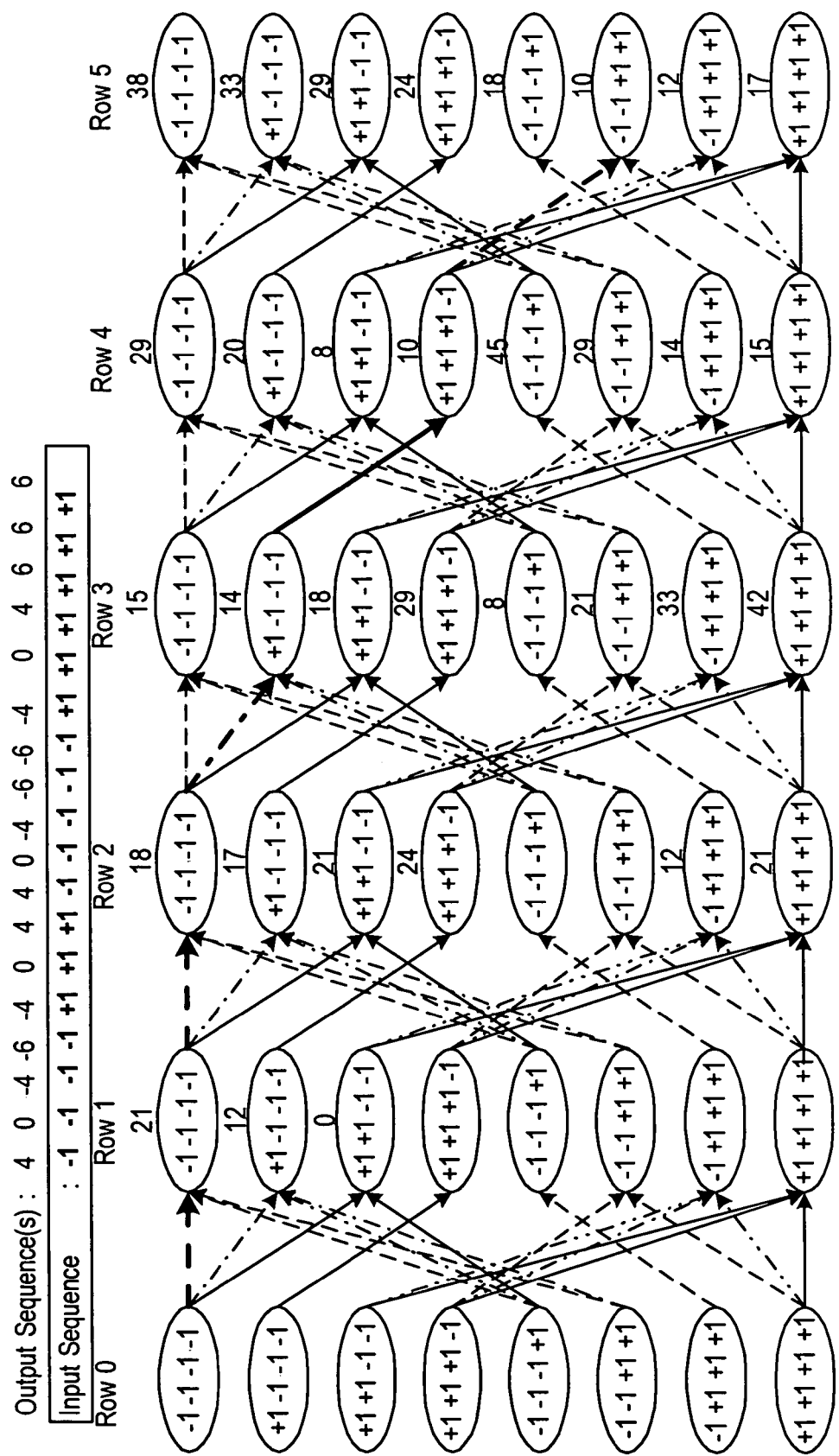
FIGS. 8A, 8B are schematic diagrams of a Viterbi decoding in accordance with FIG. 7 of the invention.
Figure 8B:
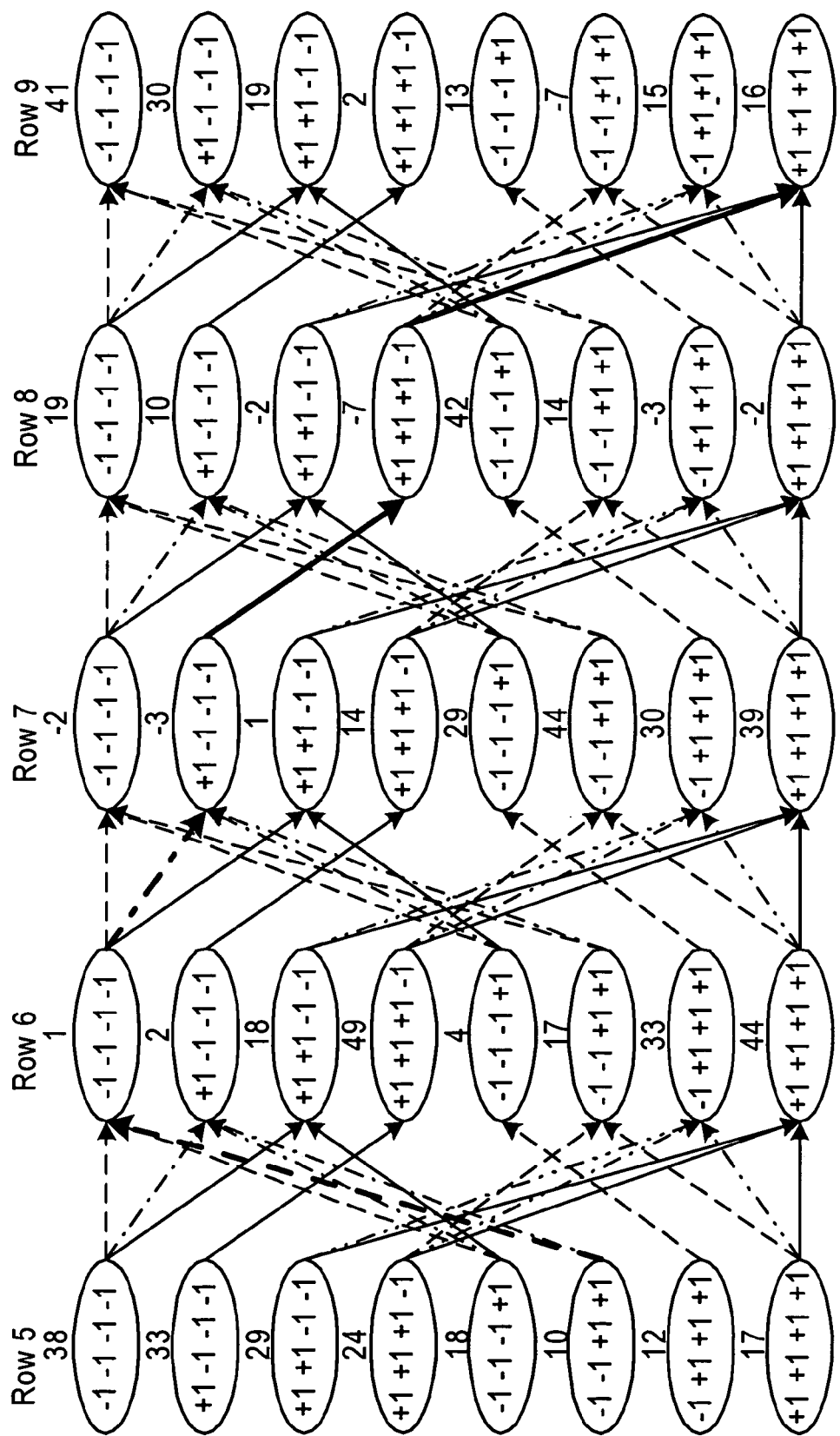

In accordance with the modified Trellis of FIG. 7, the Viterbi decoding of FIG. 4 can be changed into that of FIG. 8. For an input sequence {−1, −1, −1, −1, +1, +1, +1, −1, −1, −1, −1, −1, +1, +1, +1, +1, +1, +1}, the decoding starts with node (−1 −1 −1 −1) and computes branch metric of rows 0 and 1 in accordance with a received data. Node (−1 −1 −1 −1) has three branches connected to nodes (−1 −1 −1 −1), (−1 −1 −1 +1) and (−1 −1 +1 +1) respectively. For computing branch metric from node (−1 −1 −1 −1) to node (−1 −1 −1 −1), an output data (4) is substituted into path value equations, i.e., s=4 is substituted into equations 3s+9, 2s+4, and 0 to thus obtain values 21, 12 and 0 respectively. The values 21, 12 and 0 are denoted on the upper of nodes (−1 −1 −1 −1), (−1 −1 −1 +1) and (−1 −1 +1 +1) of row 1. When branch metric from row 1 to row 2 is computed, two bits are decoded at a time, and accordingly s=−4 is brought into equations 3s+9, 2s+4, 0, −2s+4, −2s+4 and −3s+9 to thus obtain values −3, −4, 0, 12 and 21 respectively. Next, accumulated branch metric are computed, and accordingly values 18, 17, 21, 24, 12 and 21 are obtained, which are denoted on the upper of nodes (−1 −1 −1 −1), (−1 −1 −1 +−1), (−1 −1 +1 +1), (−1 +1 +1 +1), (+1 +1 +1 −1) and (+1 +1 +1 +1) of row 2, and the like is performed thereon. Accordingly, the schematic diagram of Viterbi decoding of FIG. 8 is obtained.

The Viterbi decoder 530 performs a Viterbi decoding in accordance with the modified Trellis of FIG. 7. The Viterbi decoder 530 can reduce its sampling rate from 1/T to 1/(2T) due to two bits being used at a time, and a processing time for the adaptive equalizer 520 can be increased from 1T to 2T.

The tabs required by the adaptive equalizer 520 are increased with longer distribution of the impulse response of a transmission channel at a time axis. In this embodiment, since the processing time for the adaptive equalizer 520 is increased from 1T to 2T, the tabs required can be reduced, and the Trellis decoding depth can dramatically be reduced. As such, the required memory can be reduced, and the power consumption of a decoding chip can further be reduced.

Figure 9A:
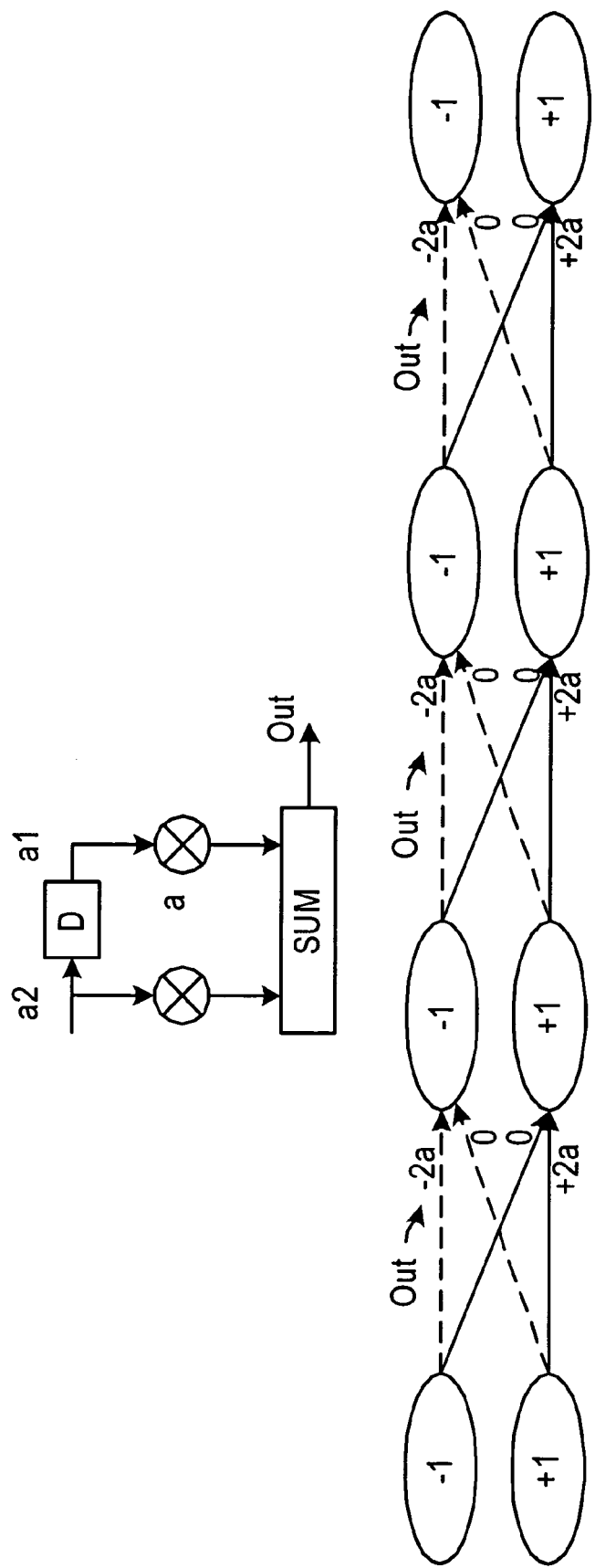
FIG. 9A is a diagram of a simplified Trellis corresponding to a PRaa channel model in accordance with the invention.
Figure 9B:
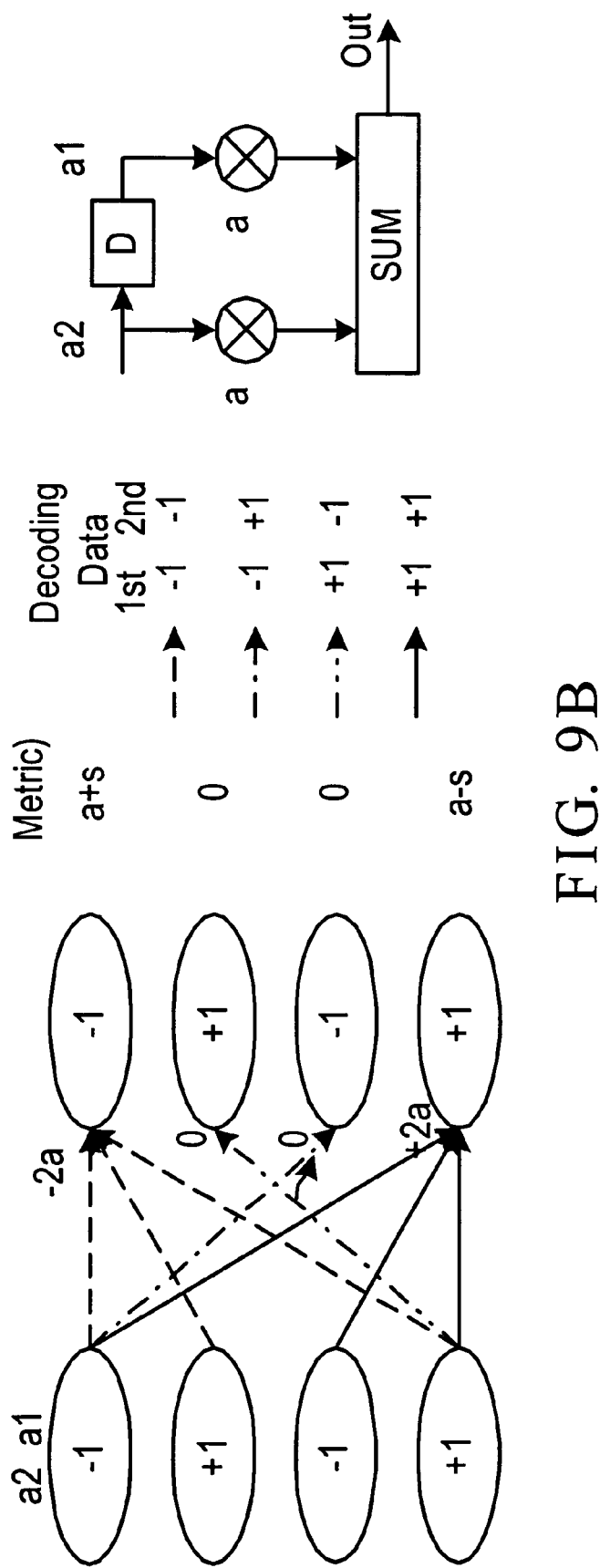
FIG. 9B is a diagram of a modified Trellis in accordance with FIG. 9A of the invention.
Figure 10A:
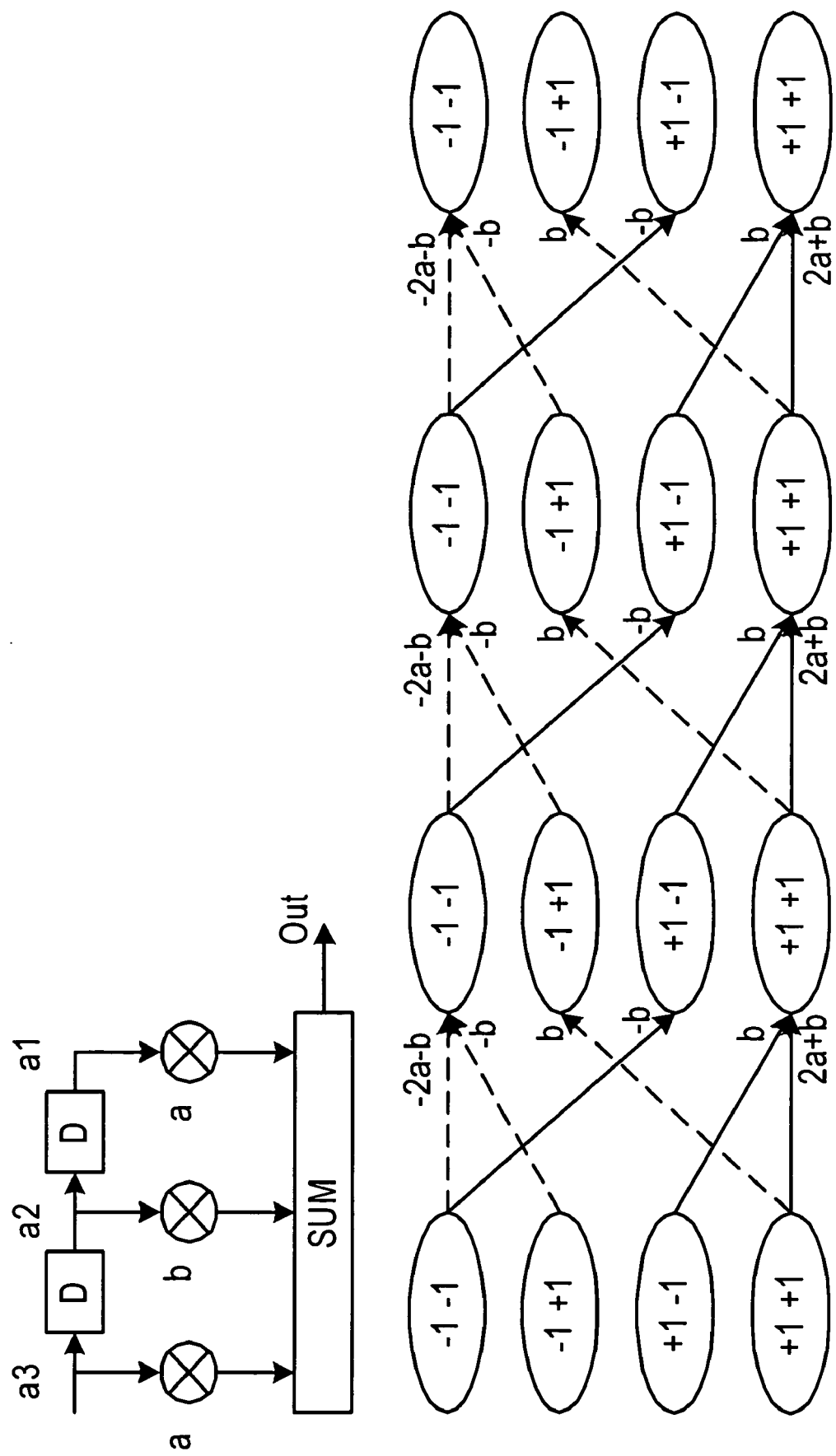
FIG. 10A is a diagram of a simplified Trellis corresponding to a. PRaba channel model in accordance with the invention.
Figure 10B:
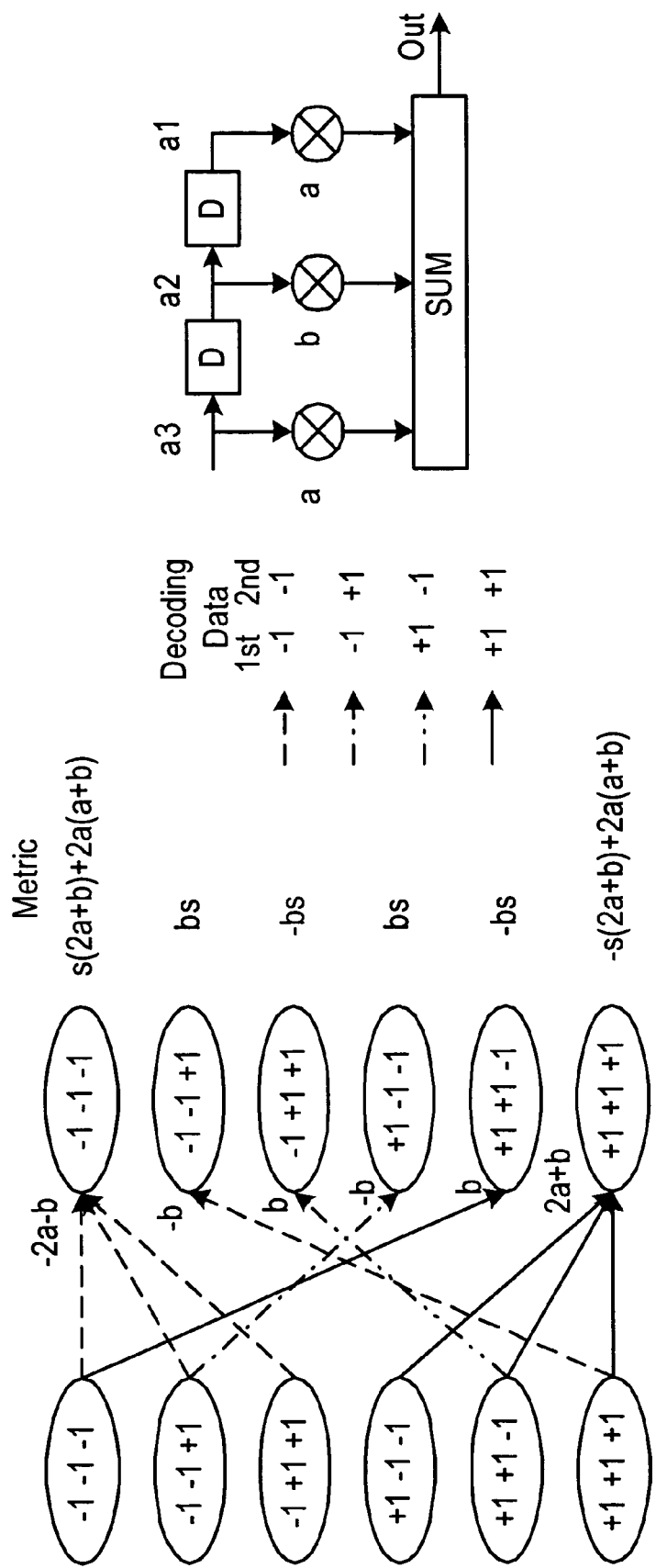
FIG. 10B is a diagram of a modified Trellis in accordance with FIG. 10A of the invention.

FIG. 9A shows a simplified Trellis diagram corresponding to a PRaa channel model. FIG. 9B shows a modified Trellis diagram of FIG. 9A. FIG. 10A shows a simplified Trellis diagram corresponding to a PRaba channel model. FIG. 10B shows a modified Trellis diagram of FIG. 10A.

In view of the foregoing, it is known that, in the present invention, the operating frequencies of the ADC 510, the adaptive equalizer 520, the Viterbi decoder 530, the slice circuit 540, and the frequency and phase recovery 550 can be reduced to a half of the prior art, and the tab numbers required by the adaptive equalizer 520 and corresponding Trellis decoding depth can be reduced relatively, thereby overcoming the problems of design complexity, decreased power consumption and heat dissipation of a typical chip.

Although the present invention has been explained in relation to its preferred embodiment, it is to be understood that many other possible modifications and variations can be made without departing from the spirit and scope of the invention as hereinafter claimed.

What is claimed is:

1. A decoding system for eight-to-fourteen modulation (EFM), comprising:
    an analog to digital converter (ADC), which receives an analog signal with an EFM feature, and converts the analog signal into a digital signal with the EFM feature;

an adaptive equalizer, which is connected to the ADC to convert the EFM digital signal into a first signal with a minimum phase feature; and a Viterbi decoder, which is connected to the adaptive equalizer to receive the first signal and to generate a decoding signal in accordance with a Viterbi algorithm and a channel model;

wherein the Viterbi decoder performs a Viterbi decoding based on a modified Trellis which is generated by modifying a trellis for decoding two bits at a time and discards nonexistent paths in accordance with the EFM feature when computing branch metric of a branch to a node.

2. The system as claimed in claim 1, further comprises:

a slice circuit, which has a hysteresis feature and converts the analog signal into a second signal; and a frequency and phase recovery circuit, which is coupled between the slice circuit and the ADC to generate an adjusting signal in accordance with the second signal to accordingly adjust sampling time of the ADC, thereby restoring frequency and phase of the analog signal.

3. The system as claimed in claim 2, wherein the second signal is a positive voltage when the analog is greater than a first hysteresis value, and the second signal is zero voltage when the analog is smaller than a second hysteresis value.

4. The system as claimed in claim 1, wherein the channel model is partial response maximum likelihood channel with parameter abba.

5. The system as claimed in claim 1, wherein the channel model is partial response maximum likelihood channel with parameter aa.

6. The system as claimed in claim 1, wherein the channel model is partial response maximum likelihood channel with parameter aba.

* * * * *

UNITED STATES PATENT AND TRADEMARK OFFICE
CERTIFICATE OF CORRECTION

PATENT NO. : 7,634,714 B2  Page 1 of 1
APPLICATION NO. : 11/390205
DATED : December 15, 2009
INVENTOR(S) : Wen-Chang Lin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 797 days.

Signed and Sealed this

Twenty-first Day of December, 2010

David J. Kappos
*Director of the United States Patent and Trademark Office*